United States Patent
Takeda et al.

(10) Patent No.: US 11,734,835 B2
(45) Date of Patent: Aug. 22, 2023

(54) IMAGE PROCESSING APPARATUS, IMAGE PROCESSING METHOD, AND PROGRAM

(71) Applicant: NIPPON TELEGRAPH AND TELEPHONE CORPORATION, Tokyo (JP)

(72) Inventors: Shoichiro Takeda, Musashino (JP); Megumi Isogai, Musashino (JP); Shinya Shimizu, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 170 days.

(21) Appl. No.: 17/432,113

(22) PCT Filed: May 31, 2019

(86) PCT No.: PCT/JP2019/021828
§ 371 (c)(1),
(2) Date: Aug. 19, 2021

(87) PCT Pub. No.: WO2020/170465
PCT Pub. Date: Aug. 27, 2020

(65) Prior Publication Data
US 2022/0138960 A1    May 5, 2022

(30) Foreign Application Priority Data
Feb. 22, 2019   (JP) ................................ 2019-030629

(51) Int. Cl.
*G06K 9/00* (2022.01)
*G06T 7/207* (2017.01)
*G06T 3/40* (2006.01)

(52) U.S. Cl.
CPC ............. *G06T 7/207* (2017.01); *G06T 3/403* (2013.01); *G06T 2207/10016* (2013.01)

(58) Field of Classification Search
CPC ..................... G06T 7/207; G06T 3/403; G06T 2207/10016; G06T 7/262; G06T 7/254
See application file for complete search history.

(56) References Cited

U.S. PATENT DOCUMENTS

| | | | |
|---|---|---|---|
| 6,373,970 B1 * | 4/2002 | Dong .................. | G06V 10/7515 382/280 |
| 9,031,131 B1 * | 5/2015 | Patankar .............. | H04N 19/521 375/240.26 |

(Continued)

OTHER PUBLICATIONS

Neal Wadhwa et al., Phase-Based Video Motion Processing, ACM Transactions on Graphics, vol. 32, No. 4, 2013.

(Continued)

*Primary Examiner* — Shervin K Nakhjavan
(74) *Attorney, Agent, or Firm* — Harness, Dickey & Pierce, P.L.C.

(57) ABSTRACT

An image processing apparatus includes a change detection unit configured to detect a phase change having a predetermined amount of change from phase changes in a subregion of an edge image having a predetermined resolution, a change amount adjustment unit configured to adjust the amount of change of the detected phase change, an adjusted image generation unit configured to generate an edge image having the predetermined resolution in which the amount of change of a motion change is adjusted based on the phase change in which the amount of change of the phase change is adjusted, and a region decision unit configured to decide a new subregion of an edge image having a new predetermined resolution based on the edge image having the predetermined resolution in which the amount of change of the motion change is not adjusted and the edge image having (Continued)

the predetermined resolution in which the amount of change of the motion change is adjusted.

8 Claims, 2 Drawing Sheets

(56) References Cited

U.S. PATENT DOCUMENTS

| | | | | |
|---|---|---|---|---|
| 9,420,164 | B1* | 8/2016 | Galor Gluskin | H04N 23/673 |
| 11,293,806 | B2* | 4/2022 | Berlatzky | G01J 9/00 |
| 2009/0002559 | A1* | 1/2009 | Poon | H04N 19/139 |
| | | | | 348/620 |
| 2010/0123824 | A1* | 5/2010 | Wada | G06T 3/403 |
| | | | | 348/E7.003 |
| 2012/0176532 | A1* | 7/2012 | Hara | H04N 25/134 |
| | | | | 348/E5.045 |
| 2012/0207218 | A1* | 8/2012 | Asamura | H04N 19/117 |
| | | | | 375/E7.125 |
| 2017/0163873 | A1* | 6/2017 | Kim | H04N 25/704 |
| 2017/0221216 | A1* | 8/2017 | Chen | G06T 7/246 |
| 2018/0084195 | A1* | 3/2018 | Yang | G06T 7/262 |

OTHER PUBLICATIONS

Shoichiro Takeda et al., Jerk-Aware Video Acceleration Magnification, IEEE Conference on Computer Vision and Pattern Recognition (CVPR), 2018, Jun. 18, 2018, pp. 1769-1777.

Neal Wadhwa et al., Riesz Pyramids for Fast Phase-Based Video Magnification, 2014 IEEE International Conference on Computational Photography (ICCP), May 2, 2014 (10 pages).

* cited by examiner

IMAGE PROCESSING APPARATUS, IMAGE PROCESSING METHOD, AND PROGRAM

CROSS-REFERENCE TO RELATED APPLICATIONS

This application is a 371 U.S. National Phase of International Application No. PCT/JP2019/021828 filed on May 31, 2019, which claims priority to Japanese Application No. 2019-030629 filed on Feb. 22, 2019. The entire disclosures of the above applications are incorporated herein by reference.

TECHNICAL FIELD

The present disclosure relates to an image processing apparatus, an image processing method, and a program.
This application claims priority to Japanese Patent Application No. 2019-030629 filed in Japan on Feb. 22, 2019, the contents of which are incorporated herein by reference.

BACKGROUND ART

The amount of change in a subtle motion change of an image in frames of a moving image may be emphasized or attenuated by an image processing apparatus. A technique for adjusting the amount of change of the subtle motion change of the image by the emphasis or attenuation is referred to as "video magnification". The image processing apparatus may visualize a physical phenomenon that is not captured by human vision in the frames of the moving image by the video magnification. The image processing apparatus may also remove unnecessary image fluctuations (for example, shakes, ground vibrations, and the like) mixed in the frames of the moving image from the frames by the video magnification.

When the subtle motion change of the image is detected based on a phase change of a local image, the image processing apparatus applies a time series filter to the frames of the moving image. Accordingly, the image processing apparatus may detect a subtle motion change of an image of an object (see Non Patent Literatures 1 and 2).

However, the image processing apparatus detects phase changes for all regions of the frames of the moving image in the video magnification, and thus, computation cost is high. Thus, a method for reducing the computation cost by reducing redundant image features and increases a processing speed of the video magnification has been proposed has been proposed (see Non Patent Literature 3).

CITATION LIST

Non Patent Literature

Non Patent Literature 1: Neal Wadhwa, Michael Rubinstein, Fredo Durand, William T. Freeman. "Phase-based Video Motion Processing". ACM Transactions on Graphics. Vol. 32. (2013). Non Patent Literature 2: Shoichiro Takeda, Kazuki Okami, Dan Mikami, Megumi Isogai, Hideaki Kimata. "Jerk-Aware Video Acceleration Magnification". IEEE International Conference on Computer Vision and Pattern Recognition (2018).

Non Patent Literature 3: Neal Wadhwa, Michael Rubinstein, Fredo Durand, William T. Freeman. "Riesz Pyramids for Fast Phase-Based Video Magnification". IEEE International Conference on Computational Photography (2014).

SUMMARY OF THE INVENTION

Technical Problem

However, even though the redundant image features are reduced, the image processing apparatus detects the phase changes for all the regions of the frames of the moving image, and thus, a computation complexity in the video magnification significantly increases depending on the resolution of the image and the number of frames.

The present disclosure has been made in view of the aforementioned circumstances, and an object of the present disclosure is to provide an image processing apparatus, an image processing method, and a program capable of suppressing an increase in a computation complexity in video magnification.

Means for Solving the Problem

An aspect of the present disclosure provides an image processing apparatus including a change detection unit configured to detect a phase change having a predetermined amount of change from phase changes in a subregion of an edge image having a predetermined resolution among different resolutions from each other, a change amount adjustment unit configured to adjust the amount of change of the detected phase change, an adjusted image generation unit configured to generate an edge image having the predetermined resolution in which the amount of change of a motion change is adjusted based on the phase change in which the amount of change of the phase change is adjusted, and a region decision unit configured to decide a new subregion of an edge image having a new predetermined resolution among the different resolutions from each other based on the edge image having the predetermined resolution in which the amount of change of the motion change is not adjusted and the edge image having the predetermined resolution in which the amount of change of the motion change is adjusted.

In the image processing apparatus according to the aspect of the present disclosure, the edge image is an image based on a difference between luminance images having the predetermined resolution.

In the image processing apparatus according to the aspect of the present disclosure, the region decision unit is configured to decide the new subregion of the edge image having the new predetermined resolution based on any of coordinates at which a maximum value of a difference between the edge image having the predetermined resolution in which the amount of change of the motion change is not adjusted and the edge image having the predetermined resolution in which the amount of change of the motion change is adjusted for each of the coordinates exceeds a predetermined value and coordinates at which the maximum value is equal to or greater than the predetermined value.

In the image processing apparatus according to the aspect of the present disclosure, the change amount adjustment unit is configured to add an original phase change in the subregion of the edge image having the predetermined resolution to a multiplication result of the detected phase change and a predetermined adjustment rate.

In the image processing apparatus according to the aspect of the present disclosure, the adjusted image generation unit is configured to multiply a value representing an amplitude change in the subregion of the edge image having the predetermined resolution by a value corresponding to the phase change in which the amount of change is adjusted.

The image processing apparatus according to the aspect of the present disclosure further includes an image decomposition unit configured to generate edge images having the different resolutions from each other, an image conversion unit configured to convert luminance changes in the subregion of the edge images having the different resolutions from each other into phase changes and amplitude changes, and an image reconstruction unit configured to reconstruct a native-resolution luminance image based on the edge image having the predetermined resolution in which the amount of change of the motion change is adjusted, and to combine the reconstructed native-resolution luminance image and a native-resolution color image.

Another aspect of the present disclosure provides an image processing method at an image processing apparatus. The method includes detecting a phase change having a predetermined amount of change from among phase changes in a subregion of an edge image having a predetermined resolution among different resolutions from each other, adjusting the amount of change of the detected phase change, generating edge images having the predetermined resolution in which the amount of change of a motion change is adjusted based on the phase change in which the amount of change of the phase change is adjusted, and deciding a new subregion of an edge image having a new predetermined resolution among the different resolutions from each other based on the edge image having the predetermined resolution in which the amount of change of the motion change is not adjusted and the edge image having the predetermined resolution in which the amount of change of the motion change is adjusted.

Yet another aspect of the present disclosure provides a program causing a computer to function as the image processing apparatus.

Effects of the Invention

According to the present disclosure, the increase in the computation complexity in the video magnification may be suppressed.

DESCRIPTION OF EMBODIMENTS

Embodiments of the present disclosure will be described in detail with reference to the drawings.

Figure 1:
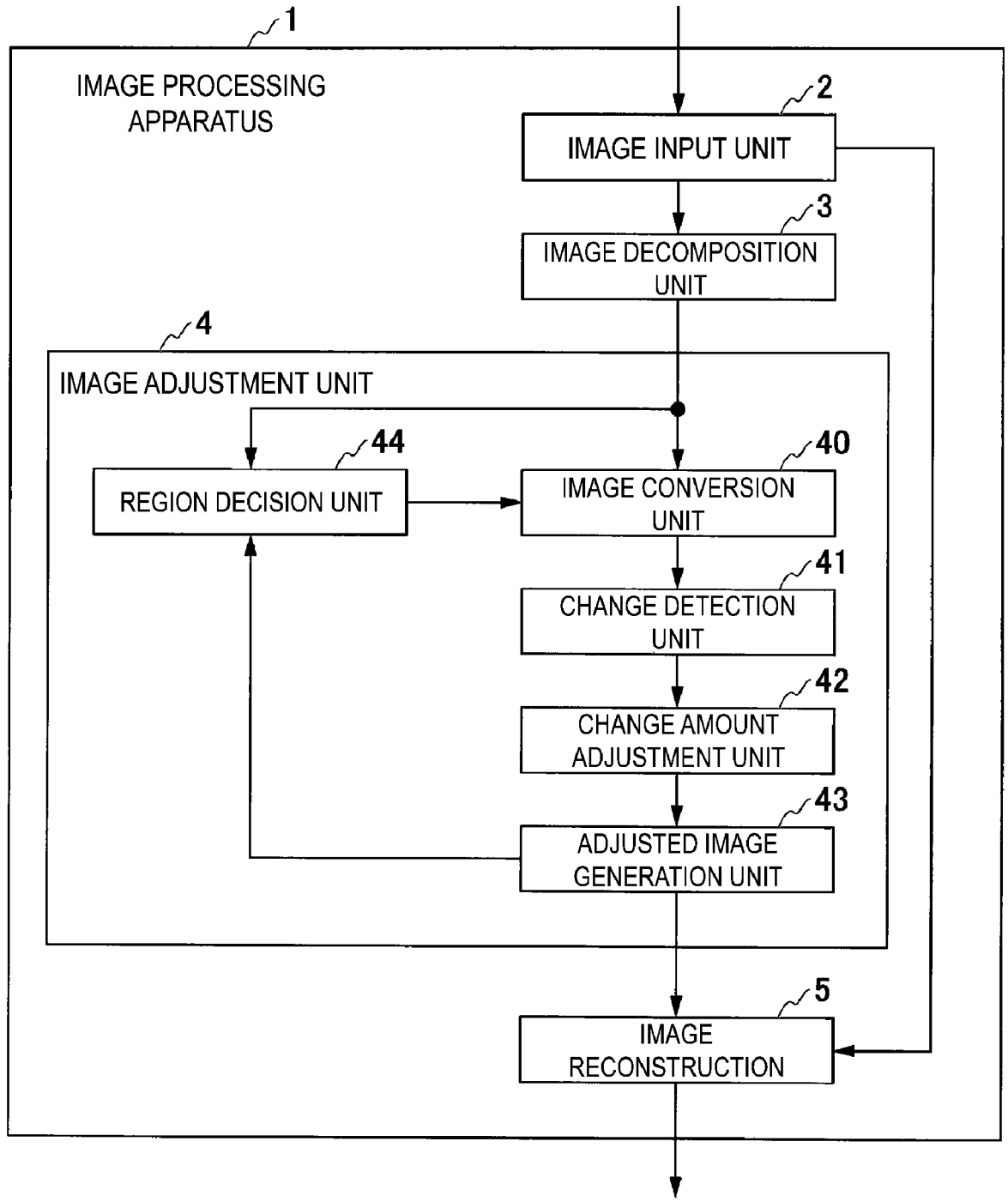
FIG. 1 is a diagram illustrating a configuration example of an image processing apparatus according to an embodiment.

FIG. 1 is a diagram illustrating a configuration example of an image processing apparatus 1. The image processing apparatus 1 is a apparatus that executes a predetermined image processing on a moving image. The predetermined image processing is, for example, processing of video magnification. The image processing apparatus 1 includes an image input unit 2, an image decomposition unit 3, an image adjustment unit 4, and an image reconstruction unit 5. These units may be provided as a single unit, for example a control unit.

Hereinafter, an image representing luminance information of a frame of the moving image is referred to as a "luminance image". Hereinafter, an image representing color information of the frame of the moving image is referred to as a "color image".

The image input unit 2 inputs the moving image as an image processing target to another functional unit. The image input unit 2 acquires a plurality of frames of the moving image as the image processing target. The image input unit 2 generates the luminance images and the color images from the plurality of frames of the moving image. The image input unit 2 outputs a native-resolution luminance image to the image decomposition unit 3. The image input unit 2 outputs a native-resolution color image to the image reconstruction unit 5.

The image decomposition unit 3 generates edge images having different resolutions from each other. For example, the image decomposition unit 3 (difference image generation unit) generates, as the edge images having different resolutions from each other, difference images between luminance images having a predetermined resolution among different resolutions from each other (multi-resolution difference images). The image decomposition unit 3 acquires the native-resolution luminance image from the image input unit 2. The image decomposition unit 3 generates luminance images having different resolutions from each other (multi-resolution luminance images) from the native-resolution luminance image. The image decomposition unit 3 generates images based on differences between the luminance images having a predetermined resolution among different resolutions from each other (hereinafter, referred to as "multi-resolution difference images"). The image decomposition unit 3 outputs the multi-resolution difference image (difference image in a resolution direction) for each resolution to the image adjustment unit 4.

The image adjustment unit 4 adjusts the amount of change of a subtle motion change of the moving image as the image processing target by emphasis or attenuation. The image adjustment unit 4 acquires the multi-resolution difference images from the image decomposition unit 3. The image adjustment unit 4 executes the video magnification on the multi-resolution difference images. The image adjustment unit 4 generates difference images between luminance images adjusted by emphasizing or attenuating the amount of change of the subtle motion change in the frames of the moving image (hereinafter, referred to as "adjusted difference images") by executing the video magnification. The image adjustment unit 4 outputs a plurality of adjusted difference images having different resolutions from each other to the image reconstruction unit 5.

The image adjustment unit 4 includes an image conversion unit 40, a change detection unit 41, a change amount adjustment unit 42, an adjusted image generation unit 43, and a region decision unit 44. A processor such as a central processing unit (CPU) executes a program stored in a memory which is a nonvolatile recording medium (non-transitory recording medium), and thus, a part or all of functional units of the image adjustment unit 4 is realized. The program may be recorded in a computer-readable recording medium. The computer-readable recording medium is, for example, a portable medium such as a flexible disk, a magneto-optical disk, a read only memory (ROM), or a compact disc read only memory (CD-ROM), or a non-transitory storage medium such as a storage device such as a hard disk drive built into a computer system. The program may be transmitted via an electrical communication line. A part or all of the functional units of the image adjustment unit 4 may be realized by using hardware including an electronic circuit (or circuitry) using a large scale integration circuit (LSI), an application specific integrated circuit (ASIC), a programmable logic device (PLD), or a field programmable gate array (FPGA). The image conversion unit 40 may be provided in a functional unit (image decomposition conversion unit) that includes the image decomposition unit 3 instead of being included in the image adjustment unit 4.

The image reconstruction unit 5 (image combination unit) reconstructs the image. The image reconstruction unit 5 acquires the plurality of adjusted difference images having different resolutions from each other from the image adjustment unit 4. The image reconstruction unit 5 reconstructs the native-resolution luminance image based on the plurality of adjusted difference images having different resolutions from each other. The image reconstruction unit 5 acquires the native-resolution color image from the image input unit 2. The image reconstruction unit 5 combines the reconstructed native-resolution luminance image and the native-resolution color image. The image reconstruction unit 5 outputs the combination result (image finally adjusted by using the video magnification) to a predetermined external device.

Next, the image processing apparatus 1 will be described in detail. The image input unit 2 acquires a plurality of frames of the moving image as the image processing target. The image input unit 2 generates, a native-resolution luminance image "$I(x,y,t)$" and a native-resolution color image from the plurality of acquired frames. "x" represents an x-coordinate in the frame of the moving image (such as the luminance image or the like). "y" represents a y-coordinate in the frame of the moving image (such as the luminance image). "t" represents a time of a frame of a time-series moving image. The image input unit 2 outputs the native-resolution luminance image "$I(x,y,t)$" to the image decomposition unit 3. The image input unit 2 outputs a native-resolution color image to the image reconstruction unit 5.

The image decomposition unit 3 acquires the luminance images of the plurality of frames of the moving image from the image input unit 2. The image decomposition unit 3 uses the native-resolution luminance image "$I(x,y,t)$" as a luminance image "$I^0(x,y,t)$" having a 0th highest resolution (highest resolution) as represented in Equation (1).

[Math. 1]

$$I^0(x,y,t)=I(x,y,t) \qquad (1)$$

The image decomposition unit 3 executes processing of dividing a spatial frequency band (band division processing) on luminance images having a plurality of resolutions. That is, the image decomposition unit 3 executes edge detection processing on the luminance images having the plurality of resolutions. Accordingly, the image decomposition unit 3 generates edge images (band-divided images) of the luminance images having the plurality of resolutions. The method for generating the edge images is not limited to a particular method. For example, the image decomposition unit 3 generates the edge images by using a band-division filter (edge filter) such as a differential filter or a high-pass filter for the luminance images. For example, the image decomposition unit 3 may generate the edge images by executing wavelet transform (octave division) on the luminance images. Hereinafter, the image decomposition unit 3 generates difference images as an example of the edge images. The image decomposition unit 3 generates a difference image "$L^n(x,y,t)$" by using downsampling and a Gaussian filter as follows.

The image decomposition unit 3 executes downsampling on a luminance image "$I^{n-1}(x,y,t)$" having a (n−1)-th predetermined resolution. The number of levels of resolutions is three or more, for example, eight. When the number of levels of resolution is defined as eight levels, the image decomposition unit 3 executes downsampling on the native-resolution luminance image seven times.

The image decomposition unit 3 convolutes a Gaussian filter "$G_\sigma(x,y)$" with the downsampling result. The number of levels of the resolution of the luminance image is defined according to a filter size of the Gaussian filter. That is, a minimum size of a block defined in the luminance image is defined according to the filter size of the Gaussian filter. The image decomposition unit 3 generates multi-resolution luminance images ("$I^0(x,y,t)$", . . . , "$I^n(x,y,t)$") by repeating a computation represented in Equation (2) on the luminance images having the first to n-th highest resolutions. Hereinafter, an operator including an "x" mark in a mark "○" among operators represented in the equation is a convolutional operator.

[Math. 2]

$$I^n(x,y,t)=G_\sigma(x,y)\otimes\text{downsample}(I^{n-1}(x,y,t)) \qquad (2)$$

A right side of Equation (2) represents a convolutional computation of "$G^\sigma(x,y)$" and "downsample ($I^{n-1}(x,y,z)$)". The image decomposition unit 3 may execute predetermined interpolation processing on the luminance images on which reduction processing is executed. "$G_\sigma(x,y)$" represents a two-dimensional Gaussian filter having a variance "$\sigma^2$". "downsample (Z)" represents processing of reducing an image having a resolution "Z" based on the amount of downsample (downsampling). The amount of downsample is a fraction, for example, ½. Hereinafter, "n" is an integer of 0 or more and N or less. N is a predetermined integer of 2 or more.

The image decomposition unit 3 executes upsampling on the luminance image "$I^{n+1}(x,y,t)$" having an (n+1)-th highest resolution. Accordingly, the image decomposition unit 3 aligns the resolution of the luminance image "$I^{n+1}(x,y,t)$" having the (n+1)-th highest resolution with the n-th predetermined resolution. That is, the image decomposition unit 3 uses the luminance image "$I^{n+1}(x,y,t)$" having the (n+1)-th highest resolution as the luminance image "upsample ($I^{n+1}(x,y,t)$)" having the (n(=n+1−1))-th highest resolution. "upsample (X)" represents processing of enlarging an image having a resolution "X" (upsampling).

The difference image "$L^n(x,y,t)$" (difference image in the resolution direction) between the luminance image "$I^n(x,y,t)$" having the n-th highest resolution and the luminance image "upsample ($I^{n+1}(x,y,t)$)" having the n-th highest resolution represented in Equation (2) is represented as in Equation (3).

[Math. 3]

$$L^n(x, y, t) = \begin{cases} I^n(x, y, t) - upsample(I^{n+1}(x, y, t)) & (n < N) \\ I^n(x, y, t) & (n = N) \end{cases} \qquad (3)$$

Each functional unit of the image adjustment unit 4 executes predetermined image processing on the difference image "$L^n(x,y,t)$" having the n-th (0≤n<N) resolution.

The image conversion unit 40 acquires the difference image "$L^n(x,y,t)$" having the n-th highest resolution from the image decomposition unit 3. The image conversion unit 40 acquires information (region information) on a subregion (X,Y) of the difference image having the n-th highest resolution from the region decision unit 44. The difference image is used as a processing target in order from a low resolution to a high resolution, and thus, an initial value of the information (region information) on the subregion (X,Y) is required in "n=N (n>0)". The clues of the subregion are not given to the image conversion unit 40, and thus, the initial value of the information on the subregion (X,Y) of the difference image having the "n-th (=N (n>0))" highest resolution is a value representing the entire region (x,y) of the difference image. The image conversion unit 40 converts a luminance change in the processing region (X,Y) included in the difference image "L"(x,y,t)" into a phase change and an amplitude change of the luminance information in a particular spatial direction.

For example, the image conversion unit 40 detects the phase change in a time direction in the difference image in order from a low (coarse) resolution to a high (fine) resolution. That is, the image conversion unit 40 executes processing of detecting the phase change in the time direction in the difference image having the low resolution earlier than processing of detecting the phase change in the difference image having the high resolution.

The method for converting, by the image conversion unit 40, the luminance change into the phase change and the amplitude change is not limited to a particular method. Hereinafter, the image conversion unit 40 converts the luminance change into the phase change and the amplitude change by, for example, Riesz transform.

The image conversion unit 40 executes, for example, Fourier transform "fft" and inverse Fourier transform "ifft" on a region "L"(X,Y,t)" included in the difference image "L"(x,y,t)" having the n-th highest resolution. That is, the image conversion unit 40 executes the Riesz transform on the region "L"(X, Y, t)" in Equation (4) to Equation (9).

[Math. 4]

$$F(\omega_x, \omega_y) = fft(L^n(X, Y, t)) \quad (4)$$

[Math. 5]

$$R_1 = ifft\left(F(\omega_X, \omega_Y) * -i\frac{\omega_X}{|\omega|}\right) \quad (5)$$

[Math. 6]

$$R_2 = ifft\left(F(\omega_X, \omega_Y) * -i\frac{\omega_Y}{|\omega|}\right) \quad (6)$$

In Equation (4) to Equation (6), relationships from Equation (7) to Equation (9) are established.

[Math. 7]

$$L^n(X,Y,t)=A^n(X,Y,t)\cdot\cos(\phi^n(X,Y,t)) \quad (7)$$

[Math. 8]

$$R_1=A(X,Y,t)\cdot\sin(\phi^n(X,Y,t))\cos(\theta^n(X,Y,t)) \quad (8)$$

[Math. 9]

$$R_2=(X,Y,t)\cdot\sin(\phi^n(X,Y,t))\sin(\theta^n(X,Y,t)) \quad (9)$$

Here, "Φ"(X,Y,t)" represents the phase change in the subregion (X,Y) of the difference image "L"(x,y,t)" having the n-th highest resolution. "θ"(X,Y,t)" represents a direction in which the phase change occurs. "A"(X,Y,t)" represents an amplitude change. The phase change "Φ"(X,Y,t)" in the subregion (X,Y) of the difference image "L"(x,y,t)" having the n-th highest resolution is represented as in Equation (10). The image conversion unit 40 outputs information on the phase change "Φ"(X,Y,t)" in the subregion (X,Y) of the difference image "L"(x,y,t)" having the n-th highest resolution to the change detection unit 41.

[Math. 10]

$$\phi^n(X, Y, t) = \tan^{-1}\left(\frac{\sqrt{R_1^2 + R_2^2}}{L^n(X, Y, t)}\right) \quad (10)$$

The change detection unit 41 acquires the information on the phase change "Φ"(X,Y,t)" in the subregion (X,Y) of the difference image "L"(x,y,t)" having the n-th highest resolution from the image conversion unit 40. The change detection unit 41 convolutes a time series filter "H(t)" with the phase change "Φ"(X,Y,t)". Accordingly, the change detection unit 41 detects a subtle change in the phase change "Φ"(X,Y,t)". The time series filter "H(t)" is not limited to a particular filter as long as a time series filter having a frequency response to the phase change (for example, subtle phase change) having a predetermined amount of change as an adjustment target (an emphasis or attenuation target) is used. The time series filter "H(t)" is, for example, a band-pass filter (see Non Patent Literature 1).

The change detection unit 41 multiplies a phase change having a predetermined amount of change (for example, subtle phase change) by a spatiotemporal filter "D(x,y,t)". Accordingly, the change detection unit 41 may remove a sharp phase change (non-gentle phase change) for a time and a space in the difference image "L"(x,y,t)" having the n-th highest resolution.

The spatiotemporal filter "D(X,Y,t)" is not limited to a particular filter as long as a spatiotemporal filter that removes the sharp phase change is used. The spatiotemporal filter "D(X,Y,t)" is, for example, a jerk filter (see Non Patent Literature 2). For example, the change detection unit 41 detects and normalizes a non-subtle and sharp change by performing third-order differential on the subtle change. The detection and normalization result is 0 when the subtle change appears, and is 1 when the sharp change appears. Accordingly, the inverse of the detection and normalization result is 1 when the subtle change appears, and is 0 when the sharp change appears. The change detection unit 41 uses, as the jerk filter, the inverse of the detection and normalization result.

That is, the change detection unit 41 executes computations on the phase change in order of the third-order differential, the normalization, and the inversion. Accordingly, the change detection unit 41 may generate the jerk filter that removes only the non-subtle and sharp phase change. The change detection unit 41 multiplies an original phase change by the jerk filter.

In other words, the change detection unit 41 executes the computations of the third-order differential and the normalization on the phase change. Accordingly, when the subtle phase change appears in the difference image, the change detection unit 41 obtains a computation result having a value of 0. When the sharp phase change appears in the difference image, the change detection unit 41 obtains a computation result having a value of 1.

The change detection unit 41 generates the jerk filter by inverting the computation result. When the subtle phase change appears in the difference image, the jerk filter has a filter response of a value of 1. When the sharp phase change appears in the difference image, the jerk filter has a filter response of a value of 0. The change detection unit 41 multiplies an original phase change by the jerk filter. When the subtle phase change appears in the difference image, the original phase change is multiplied by the value of 1, and thus, the change detection unit 41 may detect only the subtle phase change. When the sharp phase change appears in the difference image, the original phase change is multiplied by the value of 0, and thus, the change detection unit 41 may suppress the sharp phase change.

The gentle and subtle phase change "C"(X,Y,t)" is represented as in Equation (11). An operator "○" represented in Equation (11) represents multiplication (element product).

[Math. 11]

$$C^n(X,Y,t) = D(X,Y,t) \circ (H(t) \otimes \phi^n(X,Y,t)) \quad (11)$$

The change amount adjustment unit 42 acquires information on the gentle and subtle phase change "C"(X,Y,t)" in the subregion (X,Y) of the difference image "L"(x,y,t)" having the n-th highest resolution from the change detection unit 41. The change amount adjustment unit 42 multiplies the gentle and subtle phase change "C"(X,Y,t)" by a predetermined adjustment rate (emphasis rate) "α".

When the subtle phase change is emphasized, the predetermined adjustment rate "α" is a positive value. When the subtle phase change is attenuated, the predetermined adjustment rate "α" is a negative value. An upper value and a lower limit value of "α" may not be particular values. However, for example, when the subtle phase change is attenuated, the value of "α" when the value of the original phase change "Φ"(X,Y,t)" is 0 is set as the lower limit value of "α". When "α" is set to 0, the subtle phase change is not adjusted.

Hereinafter, a symbol given on a character in the equation is written immediately before the character. For example, a symbol "^" given on a character "Φ" in Equation (12) is written immediately before the character "Φ". The change amount adjustment unit 42 derives a phase change "^Φ"(X,Y,t)" in which the amount of change of the gentle and subtle phase change is adjusted as represented as in Equation (12) by adding the original phase change "Φ"(X,Y,t)" to the multiplication result. By doing this, the change amount adjustment unit 42 adjusts the amount of change of the detected subtle phase change.

[Math. 12]

$$\hat{\phi}^n(X,Y,t) = \phi^n(X,Y,t) + \alpha \cdot C^n(X,Y,t) \quad (12)$$

Here, the amount of change of a phase change in a region other than the subregion (X,Y) is not adjusted (α times), and the amount of change of the phase change in the subregion (X,Y) is adjusted. Accordingly, phase changes on a boundary surface between the region other than the subregion (X,Y) and the subregion (X,Y) do not match, and thus, block noise may be generated in the difference image. Thus, Equation (12) is extended as in Equation (13) such that the adjustment rate "α" is adjustable for each subregion (X,Y).

[Math. 13]

$$\hat{\phi}^n(X,Y,t) = \alpha(X,Y) \cdot C^n(X,Y,t) \quad (13)$$

The method for deciding the value of the adjustment rate "α(X,Y)" for each subregion is not limited to a particular method. The method for deciding the value of the adjustment rate "α(X,Y)" for each subregion may be, for example, a method for giving a uniform weight as in Equation (12), may be a method for giving any weight in advance, or may be a method for giving a weight based on a Gaussian function or the like. The change amount adjustment unit 42 outputs information on the phase change "^Φ"(X,Y,t)" in which the amount of change is adjusted to the adjusted image generation unit 43.

The adjusted image generation unit 43 acquires the information on the phase change "^Φ"(X,Y,t)" in which the amount of change is adjusted from the change amount adjustment unit 42. The adjusted image generation unit 43 generates a difference image "^L"(x,y,t)" having the n-th highest resolution in which the amount of change of the gentle and subtle motion change is adjusted based on the phase change "^Φ"(X,Y,t)" in which the amount of change is adjusted as in Equation (14). That is, the adjusted image generation unit 43 generates the adjusted difference image "^L"(x,y,t)" having the n-th highest resolution based on the phase change "^Φ"(X,Y,t)" in which the amount of change is adjusted and the amplitude change "A"(X,Y,t)" as in Equation (14).

[Math. 14]

$$\hat{L}^n(x, y, t) = \begin{cases} A^n(X, Y, t) \cdot \cos(\hat{\phi}^n(X, Y, t)) & ((x, y) \in (X, Y)) \\ L^n(x, y, t) & (\text{otherwise}) \end{cases} \quad (14)$$

The adjusted image generation unit 43 outputs the adjusted difference image "^L"n(x,y,t)" for each resolution to the region decision unit 44. The adjusted image generation unit 43 outputs the adjusted difference image "^L"(x,y,t)" having the n-th (0≤n≤N) resolution to the image reconstruction unit 5.

The region decision unit 44 acquires, as the edge image in which the amount of change of the motion change is adjusted, the adjusted difference image "^L"(x,y,t)" having the n-th (0≤n≤N) resolution from the adjusted image generation unit 43. The region decision unit 44 acquires, as the edge image in which the amount of change of the motion change is not adjusted, the difference image "L"(x,y,t)" having the n-th (0≤n≤N) resolution from the image decomposition unit 3. The region decision unit 44 compares the adjusted difference image "^L"(x,y,t)" having the n-th highest resolution with the difference image "L"(x,y,t)" having the n-th highest resolution. For example, the region decision unit 44 derives, as a comparison result "det(x,y)", a maximum value of a difference (squared value) in the spatial direction between the adjusted difference image "^L"(x,y,t)" having the n-th highest resolution and the difference image "L"(x,y,t)" having the n-th highest resolution at time "t" for each coordinates (x,y) as in Equation (15).

[Math. 15]

$$det(x, y) = \max_t (\hat{L}^n(x, y, t) - L^n(x, y, t))^2 \quad (15)$$

The comparison result "det(x,y)" may not be the maximum value of the difference (squared value) in the spatial direction between the difference image and the adjusted difference image at time "t". For example, the comparison result "det(x,y)" may be a total value or a variance value of differences (squared value) in the time direction between the difference images and the adjusted difference images in a time zone including time "t".

For example, the region decision unit 44 decides the subregion (X,Y) of the difference image "$L^{n+1}(x,y,t)$" having the (n+1)-th highest resolution as the processing target (new processing target) subsequently to the n-th highest resolution based on the comparison result. The comparison result "det(x,y)" is compared with a threshold value, and thus, the region decision unit 44 binarizes the comparison result "det(x,y)" as in Equation (16).

[Math. 16]

$$BW(x, y) = \begin{cases} 1 & (det(x, y) > thr) \\ 0 & (\text{otherwise}) \end{cases} \quad (16)$$

Here, "thr" represents a threshold value. The method for deciding the threshold value is not limited to a particular method. For example, the method for deciding the threshold value may be, for example, a method for deciding, as the threshold value "thr", a value of "average value+2× standard deviation" when it is assumed that a distribution of the value of "det(x,y)" is a normal distribution. As in an Otsu's binarization method, when "det(x,y)" is divided into two classes, a threshold value derived such that the variance between the classes is maximized may be a threshold value "thr" to be newly used.

A subregion (patch) having a predetermined size of a length "h" and a width "w" is defined for the difference image "$L''(x,y,t)$" and the adjusted difference image "$\hat{L}''(x,y,t)$". The size of the subregion is defined, for example, as a size (for example, a size of four divisions in "2×2") in which the difference image and the adjusted difference image are divided into a predetermined fine grid (minimum unit). The region decision unit 44 allocates the binarization result "BW(x,y)" to the subregion having the size of the length "h" and the width "w".

For example, the region decision unit 44 performs upsampling with an aggregate region (x, y) of the subregions including one or more binarization results "BW(x,y)=1" representing that the difference exceeds the threshold value as an aggregate region (X,Y) to match the (n−1)-th highest resolution as the processing target subsequently to the n-th highest resolution. The region decision unit 44 sets the upsampled aggregate region (X,Y) as a new subregion (X,Y) as the next processing target. The region decision unit 44 outputs region information representing the new subregion (X,Y) to the image conversion unit 40.

It is effective when the region decision unit 44 decides the processing region such that the entire region of the image having the highest resolution (the 0th highest resolution) may not be the processing target. For example, the region decision unit 44 sequentially decides the processing region starting from the lowest resolution ((N−1)-th highest resolution). The region decision unit 44 decides the new subregion as the processing target for the difference image having another resolution based on the processing result for the difference image having a predetermined resolution. The new subregion is a subregion of the difference image having another resolution, and is not the entire region of the difference image having another resolution.

That is, the region decision unit 44 starts processing of deciding the subregion (X,Y) as the processing target such that not the entire region of the difference image having the highest resolution (0th highest resolution) but the subregion is the processing target from the difference image having as low a resolution as possible. For example, the region decision unit 44 sequentially decides the subregions as the processing targets in the difference images in order from the lowest resolution to the high resolution. For example, the region decision unit 44 may decide the subregions as the processing targets in the difference images in order of the odd-numbered (or even-numbered) resolutions, and then may decide the subregions as the processing targets in the difference images in order of the even-numbered (or odd-numbered) resolutions.

The image reconstruction unit 5 acquires the adjusted difference image "$\hat{L}''(x,y,t)$" having the n-th (0≤n≤N) resolution from the adjusted image generation unit 43. The image reconstruction unit 5 acquires the color image from the image input unit 2. The image reconstruction unit 5 sequentially executes the processing represented in Equation (17) for the resolution number "n" based on Equations (1), (2), (3), and (14). The image reconstruction unit 5 reconstructs the luminance image "$\hat{I}^{n-1}(x,y,t)$" having the (n−1)-th highest resolution based on the adjusted difference image "$\hat{L}^{n-1}(x,y,t)$" having the (n−1)-th highest resolution and the luminance image "$\hat{I}^n(x,y,t)$" having the n-th highest resolution as in Equation (17).

[Math. 17]

$$\hat{I}^{n-1}(x,y,t) = \hat{L}^{n-1}(x,y,t) + \text{upsample}(\hat{I}^n(x,y,t)) \quad (17)$$

The image reconstruction unit 5 reconstructs the luminance image having the native resolution (0th highest resolution) by sequentially executing the processing represented in Equation (17) for "n". The image reconstruction unit 5 combines the reconstructed native-resolution luminance image "$\hat{I}^0(x,y,t)$" and the native-resolution color image. The image reconstruction unit 5 outputs the combination result (image finally adjusted by using the video magnification) to a predetermined external device.

The predetermined external device is, for example, a device that executes image processing other than the video magnification, a device that executes image recognition (hereinafter, referred to as an "image recognition device"), and a display device. When the predetermined external device is the image recognition device, the image recognition device may use, as a feature for image recognition, the combination result (image finally adjusted by using the video magnification).

Figure 2:
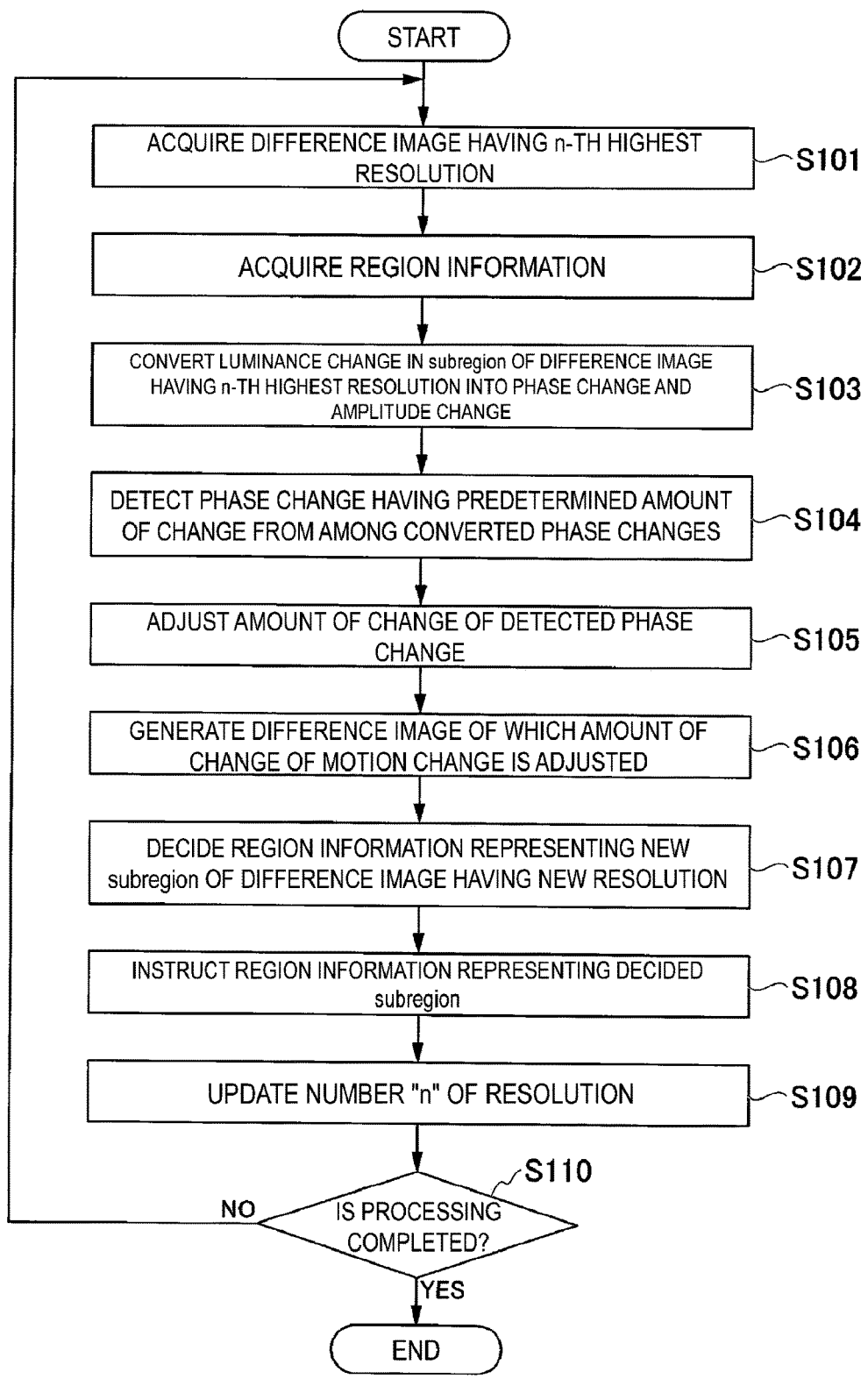
FIG. 2 is a flowchart illustrating an operation example of the image processing apparatus according to the embodiment.

Next, an operation example of the image processing apparatus 1 will be described. FIG. 2 is a flowchart illustrating the operation example of the image processing apparatus 1. The image conversion unit 40 acquires the difference image "$L''(x,y,t)$" having the n-th highest resolution (step S101). The image conversion unit 40 acquires region information representing the instructed subregion (X,Y) (step S102). The image conversion unit 40 converts the luminance change in the subregion of the difference image having the n-th highest resolution into the phase change and the amplitude change based on the region information representing the instructed subregion (X,Y) (step S103). The change detection unit 41 detects the phase change having the predetermined amount of change from the converted phase changes (step S104).

The change amount adjustment unit 42 adjusts the amount of change of the detected phase change (step S105). The adjusted image generation unit 43 generates the difference image having the n-th highest resolution in which the amount of change of the motion change is adjusted based on the phase change of which the amount of change is adjusted (step S106). The region decision unit 44 decides a subregion (X,Y) of a difference image having a new predetermined resolution (for example, (n−1)-th highest resolution) based on the difference image having the n-th highest resolution in which the amount of change of the motion change is not adjusted and the difference image having the n-th highest resolution in which the amount of change of the motion change is adjusted (step S107).

The region decision unit 44 instructs the image conversion unit 40 to use the region information representing the decided subregion (X,Y) as the new subregion of the difference image having the new predetermined resolution (step S108). The image conversion unit 40 updates the number "n" of the predetermined resolution to the number of the new predetermined resolution (step S109).

The image conversion unit 40 determines whether the processing is completed for all the (0≤n<N)-th highest resolutions (step S110). When the processing is not completed for any resolution of the difference images having all the (0≤n<N)-th highest resolutions (step S110: NO), the image conversion unit 40 returns the processing to step S101. When the processing is completed for all the resolutions of the difference images having all the (0≤n<N)-th highest resolutions (step S110: YES), each functional unit of the image processing apparatus 1 ends the processing illustrated in the flowchart of FIG. 2.

As described above, the image processing apparatus 1 according to the embodiment includes the change detection unit 41, the change amount adjustment unit 42, the adjusted image generation unit 43, and the region decision unit 44. The image processing apparatus 1 may include the image conversion unit 40. The image conversion unit 40 acquires the edge image having different resolutions from each other (multi-resolution edge image). The image conversion unit 40 converts the luminance change of the subregion of the acquired multi-resolution edge image into the phase change and the amplitude change based on the region information (X,Y) representing the instructed subregion. The change detection unit 41 detects the phase change having the predetermined amount of change from among the phase changes in the subregions of the edge images having a predetermined resolution among different resolutions from each other. The change amount adjustment unit 42 adjusts the amount of change of the detected phase change "C″(X,Y,t)". The adjusted image generation unit 43 generates the edge image "^L″(x,y,t)" having the n-th highest resolution in which the amount of change of the phase change is adjusted based on the phase change "α(X,Y)·C″(X,Y,t)" "^Φ″(X,Y,t)" in which the amount of change of the motion change is adjusted and the amplitude change "A″(X,Y,t)". The region decision unit 44 decides the region information (X,Y) representing the new subregion of the edge image having the new predetermined resolution (for example, the (n−1)-th highest resolution) based on the edge image "L″(x,y,t)" having the n-th highest resolution and the edge image "^L″(x,y,t)" having the n-th highest resolution in which the amount of change of the motion change is adjusted. The region decision unit 44 instructs the image conversion unit 40 to use the region information representing the decided new subregion (X,Y) as the new subregion of the edge image having the new predetermined resolution.

As stated above, the region decision unit 44 instructs the image conversion unit 40 to perform processing on the new subregion of the difference image having the new predetermined resolution based on the difference image having the n-th highest resolution in which the amount of change of the motion change is not adjusted and the difference image having the n-th highest resolution in which the amount of change of the motion change is adjusted. The image conversion unit 40 executes processing on the instructed new subregion.

Accordingly, an increase in the amount of computation of the video magnification may be suppressed. The image processing apparatus 1 adaptively derives the region as the processing target of the video magnification in the frame of the moving image, and thus, the amount of computation in the phase change in the frame of the moving image may be significantly reduced. A desired image with an adjusted amount of change of the subtle motion change in the frame of the moving image may be generated at a high speed.

The region decision unit 44 may compare the maximum value "det(x,y)" of the difference (squared value) between the difference image "L^{n−1}(x,y,t)" and the adjusted difference image "^L^{n−1}(x,y,t)" for each coordinates as in Equation (15) with the predetermined value "thr" as in Equation (16). The region decision unit 44 may decide the region information (X,Y) representing the new subregion of the edge image having the new predetermined resolution based on any of coordinates at which the maximum value "BW" exceeds the predetermined value "thr" and coordinates at which the maximum value "BW" is equal to or greater than the predetermined value "thr".

As in Equation (12) or Equation (13), the change amount adjustment unit 42 multiplies the detected phase change "C″(X,Y,t)" by the predetermined adjustment rate "α". Accordingly, the change amount adjustment unit 42 may adjust the amount of change of the detected phase change. The change amount adjustment unit 42 derives the phase change "^Φ″(X,Y,t)" in which the amount of change is adjusted by adding the multiplication result (adjustment result) to the original phase change "Φ″(X,Y,t)" in the subregion of the edge image having the predetermined resolution. The adjusted image generation unit 43 multiplies the value "A″(X,Y,t)" representing the amplitude change in the subregion of the edge image having the predetermined resolution by a value "cos(^Φ″(X,Y,t))" corresponding to the phase change in which the amount of change is adjusted. Accordingly, the adjusted image generation unit 43 may generate the difference image having the predetermined resolution in which the amount of change of the motion change of the image is adjusted.

The embodiments of the present disclosure have been described above in detail with reference to the drawings. However, specific configurations are not limited to those embodiments, and include any design or the like within the scope not departing from the gist of the present disclosure.

INDUSTRIAL APPLICABILITY

The present disclosure is applicable to the image processing apparatus.

REFERENCE SIGNS LIST

1 Image processing apparatus
2 Image input unit
3 Image decomposition unit
4 Image adjustment unit
5 Image reconstruction unit
40 Image conversion unit
41 Change detection unit
42 Change amount adjustment unit
43 Adjusted image generation unit
44 Region decision unit

The invention claimed is:

1. An image processing apparatus comprising:

A processor; and

A storage medium having computer program instructions stored thereon, when executed by the processor, perform to:

detect a phase change having a predetermined amount of change from phase changes in a subregion of an edge image having a predetermined resolution among different resolutions from each other;

adjust an amount of change of the detected phase change;

generate an edge image having the predetermined resolution in which an amount of change of a motion change is adjusted based on the phase change in which the amount of change of the phase change is adjusted; and decide a new subregion of an edge image having the new predetermined resolution among the different resolutions from each other based on the edge image having the predetermined resolution in which the amount of change of the motion change is not adjusted and the edge image having the predetermined resolution in which the amount of change of the motion change is adjusted.

2. The image processing apparatus according to claim 1, wherein the edge image is an image based on a difference between luminance images having the predetermined resolution.

3. The image processing apparatus according to claim 1, wherein the computer program instructions further perform to decide the new subregion of the edge image having the new predetermined resolution based on any of coordinates at which a maximum value of a difference between the edge image having the predetermined resolution in which the amount of change of the motion change is not adjusted and the edge image having the predetermined resolution in which the amount of change of the motion change is adjusted for each of the coordinates exceeds a predetermined value and coordinates at which the maximum value is equal to or greater than the predetermined value.

4. The image processing apparatus according to claim 1, wherein the computer program instructions further perform to add an original phase change in the subregion of the edge image having the predetermined resolution to a multiplication result of the detected phase change and a predetermined adjustment rate.

5. The image processing apparatus according to claim 1, wherein the computer program instructions further perform to multiply a value representing an amplitude change in the subregion of the edge image having the predetermined resolution by a value corresponding to the phase change in which the amount of change is adjusted.

6. The image processing apparatus according to claim 1 the computer program instructions further perform to:

generate edge images having the different resolutions from each other;

convert luminance changes in the subregion of the edge images having the different resolutions from each other into phase changes and amplitude changes; and reconstruct a native-resolution luminance image based on the edge image having the predetermined resolution in which the amount of change of the motion change is adjusted, and to combine the reconstructed native-resolution luminance image and a native-resolution color image.

7. A non-transitory computer-readable medium having computer-executable instructions that, upon execution of the instructions by a processor of a computer, causing the computer to function as the image processing apparatus according to claim 1.

8. An image processing method comprising, at an image processing apparatus:

detecting a phase change having a predetermined amount of change from among phase changes in a subregion of an edge image having a predetermined resolution among different resolutions from each other;

adjusting an amount of change of the detected phase change;

generating edge images having the predetermined resolution in which an amount of change of a motion change is adjusted based on the phase change in which the amount of change of the phase change is adjusted; and deciding a new subregion of an edge image having the new predetermined resolution among the different resolutions from each other based on the edge image having the predetermined resolution in which the amount of change of the motion change is not adjusted and the edge image having the predetermined resolution in which the amount of change of the motion change is adjusted.

* * * * *